United States Patent
Botel et al.

(10) Patent No.: US 8,202,922 B2
(45) Date of Patent: Jun. 19, 2012

(54) PROCESS FOR CROSS-LINKING BITUMEN/POLYMER COMPOSITIONS HAVING REDUCED EMISSIONS OF HYDROGEN SULPHIDE

(75) Inventors: Romuald Botel, Feyzin (FR); Sylvia Dreessen, Solaize (FR); Pierre Chaverot, Saint Croix en Jarez (FR); Charlotte Godivier, Malakoff (FR)

(73) Assignee: Total Raffinage Marketing, Puteaux (FR)

( * ) Notice: Subject to any disclaimer, the term of this patent is extended or adjusted under 35 U.S.C. 154(b) by 0 days.

(21) Appl. No.: 12/936,855

(22) PCT Filed: Apr. 6, 2009

(86) PCT No.: PCT/FR2009/000403
§ 371 (c)(1), (2), (4) Date: Jan. 4, 2011

(87) PCT Pub. No.: WO2009/133290
PCT Pub. Date: Nov. 5, 2009

(65) Prior Publication Data
US 2011/0098385 A1    Apr. 28, 2011

(30) Foreign Application Priority Data
Apr. 8, 2008 (FR) ..................... 08 01928

(51) Int. Cl.
*C08L 95/00* (2006.01)

(52) U.S. Cl. ................ 524/68; 524/59; 524/61; 524/66; 524/69; 524/70; 524/71

(58) Field of Classification Search ............. 524/59, 524/61, 66, 68–71
See application file for complete search history.

(56) References Cited

U.S. PATENT DOCUMENTS

| | | | |
|---|---|---|---|
| 3,035,930 | A | 5/1962 | Talley |
| 3,781,250 | A | 12/1973 | Wolpers |
| 3,960,585 | A | 6/1976 | Gaw |
| 3,997,354 | A | 12/1976 | Pivette et al. |
| 4,145,322 | A | 3/1979 | Maldonado et al. |
| 4,242,246 | A | 12/1980 | Maldonado et al. |
| 4,360,608 | A | 11/1982 | Hijikata et al. |
| 4,464,286 | A | 8/1984 | Schilling |
| 4,567,222 | A | 1/1986 | Hagenbach et al. |
| 4,599,291 | A | 7/1986 | Podszun et al. |
| 4,617,354 | A | 10/1986 | Augustin et al. |
| 4,629,754 | A | 12/1986 | Syrier et al. |
| 4,650,820 | A | 3/1987 | Decroix |
| 4,990,679 | A | 2/1991 | Wolf et al. |
| 5,078,905 | A | 1/1992 | Trinh et al. |
| 5,087,652 | A | 2/1992 | Christell |
| 5,120,777 | A | 6/1992 | Chaverot et al. |
| 5,143,999 | A | 9/1992 | Setiabudi et al. |
| 5,314,935 | A | 5/1994 | Chaverot et al. |
| 5,348,644 | A | 9/1994 | Maroy et al. |
| 5,382,612 | A | 1/1995 | Chaverot et al. |
| 5,414,029 | A | 5/1995 | Lemoine et al. |
| 5,428,085 | A | 6/1995 | Burel et al. |
| 5,618,862 | A | 4/1997 | Germanaud et al. |
| 5,632,884 | A | 5/1997 | Jamois et al. |
| 5,703,148 | A | 12/1997 | Jolivet et al. |
| 5,756,565 | A | 5/1998 | Germanaud et al. |
| 5,759,250 | A | 6/1998 | Malot et al. |
| 5,880,185 | A | 3/1999 | Planche et al. |
| 5,883,162 | A | 3/1999 | Planche et al. |
| 5,990,207 | A | 11/1999 | Perret et al. |
| 6,011,094 | A | 1/2000 | Planche et al. |
| 6,011,095 | A | 1/2000 | Planche et al. |
| 6,020,404 | A | 2/2000 | Planche et al. |
| 6,087,420 | A | 7/2000 | Planche et al. |
| 6,156,827 | A | 12/2000 | Lemoine et al. |
| 6,158,920 | A | 12/2000 | Malot |
| 6,159,279 | A | 12/2000 | Malot et al. |
| 6,218,449 | B1 | 4/2001 | Planche et al. |
| 6,767,957 | B2 | 7/2004 | Lemoine et al. |
| 6,849,581 | B1 | 2/2005 | Thompson et al. |
| 6,852,779 | B1 | 2/2005 | Planche et al. |
| 6,927,248 | B2 | 8/2005 | Lemoine et al. |
| 7,081,492 | B1 * | 7/2006 | Krivohlavek ............. 524/476 |
| 7,399,402 | B2 | 7/2008 | Olivier et al. |
| 7,534,924 | B2 | 5/2009 | Lemoine et al. |

(Continued)

FOREIGN PATENT DOCUMENTS

| | | |
|---|---|---|
| AU | 2060483 | 7/1984 |
| EP | 0020203 A1 | 12/1980 |
| EP | 0121377 A1 | 10/1984 |
| EP | 0157269 A1 | 10/1985 |
| EP | 0179510 A1 | 4/1986 |
| EP | 0360656 A1 | 3/1990 |
| EP | 0370446 A2 | 5/1990 |
| EP | 0416682 A1 | 3/1991 |
| EP | 0690892 A1 | 1/1996 |
| EP | 0799280 A1 | 10/1997 |
| EP | 0837909 A1 | 4/1998 |
| EP | 0870793 A2 | 10/1998 |

(Continued)

OTHER PUBLICATIONS

Terech, P. et al., "Low Molecular Mass Gelators of Organic Liquids and the Properties of Their Gels" 1997, Chemical Reviews, ACS, Washington, DC, US., pp. 3133-3159, XP002127859 ISSN: 0009-2665.

*Primary Examiner* — Peter Szekely
(74) *Attorney, Agent, or Firm* — Harness, Dickey & Pierce, P.L.C.

(57) ABSTRACT

The disclosure relates to a method of preparing crosslinked bitumen/polymer compositions having reduced emissions of hydrogen sulphide, in which, while operating at temperatures between 100° C. and 230° C. and with stirring, for a duration of at least ten minutes, at least one bitumen or mixture of bitumens is brought into contact with at least one polymer and at least one crosslinking agent, said crosslinking agent being represented by the general formula HS—R—SH where R represents a saturated or unsaturated, linear or branched, cyclic and/or aromatic hydrocarbon-based group having 2 to 40 carbon atoms, optionally comprising one or more heteroatoms, and that does not comprise a C=O carbonyl function and/or a O—C=O carboxylate function.

31 Claims, No Drawings

U.S. PATENT DOCUMENTS

| | | |
|---|---|---|
| 7,577,061 B2 | 8/2009 | Williamson et al. |
| 2002/0045699 A1 | 4/2002 | Scholl et al. |
| 2002/0052431 A1 | 5/2002 | Lemoine et al. |
| 2002/0052432 A1 | 5/2002 | Lemoine et al. |
| 2003/0127169 A1 | 7/2003 | Hergenrother et al. |
| 2004/0223987 A1 | 11/2004 | Ferrari |
| 2008/0308007 A1 | 12/2008 | Lapalu et al. |
| 2009/0030118 A1 | 1/2009 | Lapalu et al. |
| 2009/0062551 A1 | 3/2009 | Tournilhac et al. |

FOREIGN PATENT DOCUMENTS

| | | |
|---|---|---|
| EP | 0907687 A1 | 4/1999 |
| EP | 1110973 A1 | 6/2001 |
| EP | 1350813 A1 | 10/2003 |
| EP | 1572807 A2 | 9/2005 |
| EP | 1576058 A1 | 9/2005 |
| FR | 2254609 A1 | 7/1975 |
| FR | 2376188 A1 | 7/1978 |
| FR | 2525618 A1 | 10/1983 |
| FR | 2536081 A1 | 5/1984 |
| FR | 2558845 A1 | 8/1985 |
| FR | 2762322 A1 | 10/1998 |
| FR | 2762323 A1 | 10/1998 |
| FR | 2849047 A1 | 6/2004 |
| FR | 2849048 A1 | 6/2004 |
| FR | 2889198 A1 | 2/2007 |
| GB | 414336 A | 8/1934 |
| GB | 2076824 A | 12/1981 |
| IT | 1121867 B | 4/1986 |
| JP | 50139135 A | 11/1975 |
| JP | 5119035 A | 2/1976 |
| JP | 5265549 A | 5/1977 |
| JP | 56014573 A | 2/1981 |
| JP | 57158275 A | 9/1982 |
| JP | 58204203 A | 11/1983 |
| JP | 11106578 A | 4/1999 |
| WO | WO-9422958 A1 | 10/1994 |
| WO | WO-9616128 | 5/1996 |
| WO | WO-9714754 A1 | 4/1997 |
| WO | WO-9847967 A1 | 10/1998 |
| WO | WO-02053645 A | 7/2002 |
| WO | WO-02053645 A1 | 7/2002 |
| WO | WO-02055030 A | 7/2002 |
| WO | WO-02055030 A2 | 7/2002 |
| WO | WO-03037974 A2 | 5/2003 |
| WO | WO-2005059016 A1 | 6/2005 |
| WO | WO-2005065177 A2 | 7/2005 |
| WO | WO-2006087475 A1 | 8/2006 |
| WO | WO-2007112335 | 10/2007 |
| WO | WO-2009016281 A2 | 2/2009 |

\* cited by examiner

PROCESS FOR CROSS-LINKING BITUMEN/POLYMER COMPOSITIONS HAVING REDUCED EMISSIONS OF HYDROGEN SULPHIDE

CROSS-REFERENCE TO RELATED APPLICATIONS

This application is a National Phase Entry of International Application No. PCT/FR2009/000403, filed on Apr. 6, 2009, which claims priority to French Application No. 08 01 928, filed on Apr. 8, 2008, both of which are incorporated by reference herein.

TECHNICAL FIELD

The present invention belongs to the field of bitumens. More specifically, it relates to a process for preparing cross-linked bitumen/polymer compositions having reduced emissions of hydrogen sulphide. The invention also relates to bitumen/polymer compositions comprising a cross-linking agent making it possible to obtain cross-linked bitumen/polymer compositions with reduced emissions of hydrogen sulphide. The invention also relates to the use of cross-linking agents for cross-linking bitumen/polymer compositions while limiting the emissions of hydrogen sulphide.

BACKGROUND

The use of bitumen in the manufacture of materials for highway and industrial applications has been known for a long time: bitumen is the main hydrocarbon binder used in the field of road construction or civil engineering. To be able to be used as a binder in these different applications, the bitumen must have certain physico-chemical and mechanical properties. It is well known that the mechanical properties of pure bitumens can be modified by the addition of polymers.

Numerous polymers have been used in bitumen/polymer compositions, such as for example styrene and butadiene copolymers, in order to improve the rheological properties of pure bitumens. It is also well known that the physico-chemical properties of bitumen/polymer compositions are further improved when the polymers are cross-linked with sulphur for example. However, during the preparation of the bitumen/polymer compositions cross-linked with sulphur, the cross-linking is accompanied by emissions of hydrogen sulphide ($H_2S$). Hydrogen sulphide is a colourless and toxic gas, having a characteristic odour at very low concentrations. Environmental constraints make it necessary to reduce or even eliminate emissions of hydrogen sulphide in particular during the cross-linking of polymers in the bitumen/polymer compositions.

In order to reduce the emissions of hydrogen sulphide, numerous patents describe the addition of inhibitors during the cross-linking with sulphur of bitumen/polymer compositions. In patent FR2254609, a process for reducing the emission of hydrogen sulphide by hot mixtures containing sulphur and bitumen is claimed. In order to reduce the emissions of hydrogen sulphide, a hydrogen sulphide suppressant is added to a bitumen/sulphur mixture. This suppressant is chosen from free radical inhibitors and redox catalysts. Tetramethylthiuram disulphide may be mentioned for example as a free radical inhibitor and iron chloride as a redox catalyst.

In patent EP0121377, a process is described, for preparing a mixture comprising bitumen and elemental sulphur making it possible to reduce the release of hydrogen sulphide. In this process, the agent making it possible to reduce the release of sulphide is a metal carboxylate or naphthenate. Zinc stearate is one of the preferred compounds.

In the application WO2005059016, sulphur pellets comprising a hydrogen sulphide suppressant are described. The agent is chosen from free radical inhibitors and redox catalysts. The preferred agent is iron chloride.

In application WO2005065177, a process for reducing emissions of hydrogen sulphide is described. In this process, a metal salt is added to the bitumen and to the sulphur. Zinc oxide is one of the preferred compounds.

In patent EP0907687, a process is described for cross-linking bitumen/polymer compositions where different functionalizing agents are used. These functionalizing agents are chosen from carboxylic polythiolesters and/or polythioethers, there is no indication that the functionalizing agents described make it possible to reduce emissions of hydrogen sulphide.

SUMMARY

Under these circumstances, the purpose of the present invention is to propose a novel process for preparing cross-linked bitumen/polymer compositions having reduced emissions of hydrogen sulphide, in particular a reduction in the emissions of hydrogen sulphide in the first phase of the process, said process being based on the use of novel cross-linking agents. Another objective of the invention is to propose a simple process for preparing cross-linked bitumen/polymer compositions without emissions of hydrogen sulphide making it possible to obtain compositions having satisfactory rheological characteristics in particular in terms of elasticity and consistency. Another objective of the invention is the use of cross-linking agents allowing the cross-linking of bitumen/polymer compositions with minimal emissions of hydrogen sulphide while obtaining compositions having satisfactory rheological characteristics in particular in terms of elasticity and consistency. An objective of the invention is to propose novel cross-linked bitumen/polymer compositions having rheological characteristics equivalent to bitumen/polymer compositions cross-linked with sulphur, in particular in terms of elasticity and consistency, and having reduced or even zero emissions of hydrogen sulphide, during their cross-linking.

The invention relates to a process for preparing cross-linked bitumen/polymer compositions with reduced emissions of hydrogen sulphide, in which, while operating at temperatures comprised between 100° C. and 230° C. and under stirring, for a duration of at least ten minutes, at least one bitumen or mixture of bitumens is brought into contact with at least one polymer and at least one cross-linking agent, said cross-linking agent being represented by the general formula HS—R—SH where R represents a saturated or unsaturated, linear or branched, cyclic and/or aromatic hydrocarbon group with 2 to 40 carbon atoms, optionally comprising one or more heteroatoms, and not comprising a carbonyl C═O function and/or carboxylate O—C═O function. Preferably, the heteroatoms are oxygen atoms. Preferably, the number of oxygen atoms varies from 0 to 5, preferably from 1 to 4, preferably from 2 to 3. Preferably, the R group represents a saturated or unsaturated, linear or branched, cyclic and/or aromatic hydrocarbon group with 4 to 20 carbon atoms, preferably 6 to 18 carbon atoms, preferably 8 to 12 carbon atoms.

In a first embodiment, the R group represents a saturated, linear, exclusively hydrocarbon group with 2 to 40 carbon atoms, preferably of 4 to 20 carbon atoms, preferably 6 to 18 carbon atoms, preferably 8 to 12 carbon atoms. In a second embodiment, the R group represents a linear, saturated, hydrocarbon group comprising one or more heteroatoms. Preferably, the R group has the general formula —$(CH_2)_m$—O—$(CH_2)_n$— with m and n being integers varying from 1 to 20, preferably from 2 to 10. Preferably, the R group has the general formula —$(CH_2)_p$—O—$(CH_2)_q$—O—$(CH_2)_r$— with p, q and r being integers varying from 1 to 10, preferably from 2 to 6. In a third embodiment, the R group represents an unsaturated group, comprising at least one aromatic ring, preferably at least two aromatic rings.

The quantity of cross-linking agent of general formula HS—R—SH is comprised between 0.05 and 5% by mass. The polymer is a copolymer based on conjugated diene units and aromatic monovinyl hydrocarbon units. The conjugated diene unit is chosen from those comprising 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and their mixtures. The aromatic monovinyl hydrocarbon unit is chosen from styrene, o-methyl styrene, p-methyl styrene, p-tert-butylstyrene, 2,3 dimethyl-styrene, α-methyl styrene, vinyl naphthalene, vinyl toluene, vinyl xylene, and analogues or mixtures thereof, in particular styrene. The quantity of polymer is comprised between 0.5 and 20% by mass, preferably between 1 and 10%, preferably between 2 and 5%.

The bitumen is chosen from the atmospheric distillation residues, vacuum distillation residues, visbroken residues, blown residues, deasphalted residues, mixtures thereof and combinations thereof. The bitumen also comprises at least one flux.

The invention also relates to the use of a cross-linking agent of general formula HS—R—SH, as defined above, for reducing the emissions of hydrogen sulphide during the preparation of cross-linked bitumen/polymer compositions. The invention also relates to the use of cross-linked bitumen/polymer compositions obtained by the process, as defined above, in order to produce a bituminous binder in anhydrous form or in the form of an emulsion. The invention also relates to the use of cross-linked bitumen/polymer compositions obtained by the process, as defined above, in a mixture with aggregates in order to produce a surface dressing, a hot mix, a cold mix, a cold-cast mix, a gravel emulsion, which can be used as a base course, bonding course and/or wearing course. The invention also relates to the use of cross-linked bitumen/polymer compositions obtained by the process, as defined above, in order to produce a sealing membrane, a membrane or a priming coat.

The invention finally relates to a bitumen/polymer composition comprising at least one bitumen, at least one polymer and at least one cross-linking agent of general formula HS—R—SH where R represents a saturated or unsaturated, linear or branched hydrocarbon group, with 2 to 40 carbon atoms, optionally comprising one or more heteroatoms, preferably one or more oxygen atoms, said R group excluding the presence of a carbonyl C═O function and/or carboxylate O—C═O function. Preferably, the number of oxygen atoms varies from 0 to 5, preferably from 1 to 4, preferably from 2 to 3. Preferably, the R group is as defined above.

Preferably, the quantity of cross-linking agent of general formula HS—R—SH is comprised between 0.05 and 5% by mass. Preferably, the polymer is a copolymer based on conjugated diene units and aromatic monovinyl hydrocarbon units. Preferably, the conjugated diene unit is chosen from those comprising 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof. Preferably, the aromatic monovinyl hydrocarbon unit is chosen from styrene, o-methyl styrene, p-methyl styrene, p-tert-butylstyrene, 2,3 dimethyl-styrene, α-methyl styrene, vinyl naphthalene, vinyl toluene, vinyl xylene, and analogues or mixtures thereof, in particular styrene. Preferably, the quantity of polymer is comprised between 0.5 and 20% by mass, preferably between 1 and 10%, preferably between 2 and 5%.

Preferably, the bitumen is chosen from the atmospheric distillation residues, vacuum distillation residues, visbroken residues, blown residues, deasphalted residues, mixtures thereof and combinations thereof. Preferably, the bitumen also comprises at least one flux.

DETAILED DESCRIPTION

The cross-linking agent used in the process according to the invention has the general formula HS—R—SH where R represents a saturated or unsaturated, linear or branched, cyclic and/or aromatic hydrocarbon group with 2 to 40 carbon atoms, optionally comprising one or more heteroatoms such as oxygen and not comprising a carbonyl C═O function and/or carboxylate O—C═O function. The cross-linking agent according to the invention possesses at each of its ends, a thiol function making it possible to bind the polymers with each other, separated by the R group defined previously. The R group is preferably a saturated or unsaturated, linear or branched, cyclic and/or aromatic hydrocarbon group comprising 4 to 20 carbon atoms, preferably 6 to 18 carbon atoms, preferably 8 to 12 carbon atoms. When the R group is substituted by heteroatoms, oxygen atoms are preferred. When the R group is substituted by oxygen atoms, the number of oxygen atoms can vary from one to five, preferably from one to four, preferably from two to three.

The R groups not comprising any carbonyl C═O functions and/or carboxylate O—C═O functions, as can be found for example in the carboxylic acids or esters are also preferred. In fact, the presence of these functions can lead to and/or increase the formation of hydrogen sulphide. The absence of carbonyl C═O functions and/or of carboxylate O—C═O functions makes it possible to obtain cross-linked bitumen/polymer compositions having good elastic properties, in particular in terms of elastic recovery and traction, whilst minimizing the quantities of hydrogen sulphide released during the process for preparing said cross-linked bitumen/polymer compositions.

In a first embodiment, the R group is a saturated hydrocarbon group, not comprising a double bond. The R group can be saturated and linear or saturated and branched; the saturated and linear R groups are preferred. When the R group is a saturated and linear group, it may or may not comprise heteroatoms, such as oxygen. When the R group comprises no heteroatoms, the R group is a saturated, exclusively hydrocarbon group.

On the one hand, the saturated, linear, exclusively hydrocarbon R groups, with 2 to 40 carbon atoms, preferably 4 to 20 carbon atoms, preferably 6 to 18 carbon atoms, preferably 8 to 12 carbon atoms are preferred. When R is a linear, saturated, exclusively hydrocarbon group, the cross-linking agents according to the invention are for example, 1,2-ethanedithiol, 1,3-propanedithiol, 1,4-butanedithiol, 1,5-pentanedithiol, 1,6-hexane-dithiol, 1,7-heptanedithiol, 1,8-octanedithiol. The preferred cross-linking agent is 1,8-octanedithiol where R is a saturated, linear exclusively hydrocarbon group with 8 carbon atoms.

On the other hand, the saturated, linear R groups comprising one or more heteroatoms, such as oxygen, are preferred. Preferably, the R group is substituted by one or two oxygen atoms. When the R group is substituted by a single oxygen atom, the cross-linking agent HS—R—SH has the general formula HS—$(CH_2)_m$—O—$(CH_2)_n$—SH with R representing the —$(CH_2)_m$—O—$(CH_2)_n$— group with n and m being integers varying from 1 to 20, preferably from 2 to 10. There may be mentioned for example bis-(2-mercaptoethyl)-ether, bis-(3-mercaptoethyl)-ether, bis-(4-mercaptoethyl)-ether respectively with m and n having a value of 2, 3 and 4. There may also be mentioned for example (2-mercaptoethyl) (3-mercaptobutyl)-ether with m having a value of 2 and n a value of 3; (2-mercaptoethyl) (4-mercaptobutyl)-ether with m having a value of 2 and n a value of 4. When the R group is substituted by two oxygen atoms the cross-linking agent HS—R—SH has the general formula HS—$(CH_2)_p$—O—$(CH_2)_q$—O—$(CH_2)_r$—SH with R representing the —$(CH_2)_p$—O—$(CH_2)_q$—O—$(CH_2)_r$— group with p, q and r being integers varying from 1 to 10, preferably from 2 to 6. Preferred cross-linking agents are such that p and r have a value of 2 and q a value of 1, or p, q and r have a value of 2 (such as for example in 1,8-dimercapto-3,6-dioxaoctane).

In a second embodiment, the R group is an unsaturated group. The R group can comprise one or more double bonds, along a carbonated chain or in rings of 5 to 6 carbon atoms for example. The R group can also be aromatic, i.e. may comprise at least one aromatic ring. The R group comprises at least one aromatic ring, preferably at least two aromatic rings.

When the R group comprises a single aromatic ring, the preferred cross-linking agents are benzene-1,2-dithiol, benzene-1,3-dithiol, benzene-1,4-dithiol or toluene-3,4-dithiol. The R group can also comprise at least 2 aromatic rings. The aromatic rings of the R group may be condensed or not, they are preferably vicinal. They may be optionally substituted by alkyl or alkoxy groups. When the R group comprises two vicinal aromatic rings, one of the preferred cross-linking agents is biphenyl-4,4'-dithiol.

The quantity of cross-linking agent utilized in the process of the invention is comprised between 0.05 and 5% by mass, preferably between 0.1 and 2%, preferably between 0.2 and 1%, preferably between 0.3 and 0.5% by mass. It is possible to envisage using the cross-linking agents as defined above alone or in a mixture.

The polymers which can be used in the process according to the invention are the polymers which can be used in a standard fashion in the field of bitumens/polymers such as for example the polybutadienes, polyisoprenes, butyl rubbers, polyacrylates, polymethacrylates, polychloroprenes, polynorbornenes, polybutenes, polyisobutenes, polyolefins such as polyethylenes or high density polyethylenes, polypropylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene (EPDM) terpolymers, acrylonitrile/butadiene/styrene (ABS) terpolymers, ethylene/acrylate or alkyl methacrylate/glycidyl acrylate or methacrylate terpolymers and in particular ethylene/methyl acrylate/glycidyl methacrylate terpolymer and ethylene/alkyl acrylate or methacrylate/maleic anhydride terpolymers and in particular ethylene/butyl acrylate/maleic anhydride terpolymer. The polymers can also be the polymers described in the Applicant company's patents EP1572807, EP0837909 and EP1576058.

The preferred polymers are the copolymers based on conjugated diene units and aromatic monovinyl hydrocarbon units. The polymers according to the invention comprise one or more copolymers based on conjugated diene units and aromatic monovinyl hydrocarbon units. The conjugated diene is chosen from those comprising 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof. The aromatic monovinyl hydrocarbon is chosen from styrene, o-methyl styrene, p-methyl styrene, p-tert-butylstyrene, 2,3 dimethyl-styrene, α-methyl-styrene, vinyl naphthalene, vinyl toluene, vinyl xylene, and analogues or mixtures thereof, in particular styrene.

More particularly, the polymer consists of one or more copolymers chosen from the styrene and butadiene, styrene and isoprene, styrene and chloroprene, styrene and carboxylated butadiene or also styrene and carboxylated isoprene block copolymers. A preferred polymer is a copolymer based on butadiene units and styrene units such as the styrene/butadiene block copolymer SB or the styrene/butadiene/styrene block copolymer SBS. The styrene and conjugated diene copolymer, in particular the styrene and butadiene copolymer, advantageously have a content by weight of styrene ranging from 5 to 50%, preferably from 20 to 50%. The styrene and conjugated diene copolymer, in particular the styrene and butadiene copolymer, advantageously have a content by weight of (1,2 and 1,4) butadiene ranging from 50 to 95%. The styrene and conjugated diene copolymer, in particular the styrene and butadiene copolymer, advantageously have a content by weight of 1,2-butadiene ranging from 5 to 70%. The 1,2-butadiene units are the units which result from polymerisation via the 1,2 addition of the butadiene units.

The average molecular mass of the styrene and conjugated diene copolymer, and in particular that of the styrene and butadiene copolymer, can be comprised, for example, between 10,000 and 500,000, preferably between 50,000 and 200,000 and more preferentially between 50,000 and 150,000 daltons. The quantity of polymer utilized in the process of the invention is comprised between 0.5 and 20% by mass, preferably between 1 and 10%, more preferably between 2 and 5%.

The bitumens used in the process of the invention are bitumens obtained from different origins. There can be mentioned firstly the bitumens of natural origin, those contained in deposits of natural bitumen, natural asphalt or bituminous sands. The bitumens according to the invention are also the bitumens originating from the refining of crude oil. The bitumens originate from the atmospheric and/or vacuum distillation of oil. These bitumens are able to be optionally blown, visbroken and/or deasphalted. The bitumens can be bitumens of hard or soft grade. The different bitumens obtained by the refining process can be combined with each other in order to obtain the best technical compromise.

The bitumens used can also be bitumens fluxed by adding volatile solvents, fluxes originating from oil, carbochemical fluxes and/or fluxes of vegetable origin. It is also possible to use synthetic bitumens also called clear, pigmentable or colourable bitumens. These bitumens contain few or no asphaltenes and can as a result be coloured. These synthetic bitumens are based on a petroleum resin and/or coumarone-indene resin and lubricating oil as described for example in patent EP179510.

EXAMPLES

Bituminous Composition $T_1$ (Control)

A control bituminous composition $T_1$ is prepared in which the polymer is not cross-linked (physical mixture of bitumen and polymer). The control bituminous composition $T_1$ is prepared as follows:

The following are introduced into a 2-litre hermetically sealed reactor under stirring (300 rpm) and at 195° C.:

95% by mass of a direct distillation bitumen with a penetrability of 50¹/₁₀ mm according to standard NF EN 1426 and 5% by mass of a styrene/butadiene block copolymer, with 25% by weight styrene and 75% by weight butadiene having a molecular mass by weight, Mw of 128,000 Dalton.

The mixture is stirred at 300 rpm and heated at 195° C. for 2 hours. The quantities used are as follows: 1772.2 grams of bitumen and 93.3 grams of styrene/butadiene block copolymer.

Bituminous Composition T₂ (Control)

A control bituminous composition T₂ is prepared in which the polymer is cross-linked with sulphur (vulcanization). The control bituminous composition T₂ is prepared as follows:
The following are introduced into a 2-litre hermetically sealed reactor under stirring (300 rpm) and at 195° C.:

94.87% by mass of a direct distillation bitumen with a penetrability of 50¹/₁₀ mm according to standard NF EN 1426 and 5% by mass of a styrene/butadiene block copolymer, with 25% by weight styrene and 75% by weight butadiene having a molecular mass by weight, Mw of 128,000 Dalton.

The bitumen/polymer mixture is stirred at 300 rpm and heated at 195° C. for approximately 2 hours. Then 0.13% by mass of sulphur (flowers of sulphur) is added. The mixture is stirred at 300 rpm and heated at 195° C. for 2 hours. The quantities used are as follows: 1037.1 grams of bitumen, 54.7 grams of styrene/butadiene block copolymer and 1.42 grams of sulphur.

Bituminous Composition T₃ (Control)

A control bituminous composition T₃ is prepared in which the polymer is cross-linked with dimercaptosuccinic acid of formula HS—CH₂(COOH)—CH₂(COOH)—SH. The control bituminous composition T₃ is prepared as follows: The following are introduced into a 2-litre hermetically sealed reactor under stirring (300 rpm) and at 195° C.:

94.87% by mass of a direct distillation bitumen with a penetrability of 50¹/₁₀ mm according to standard NF EN 1426 and 5% by mass of a styrene/butadiene block copolymer, with 25% by weight styrene and to 75% by weight butadiene having a molecular mass by weight, Mw of 128,000 Dalton.

The bitumen/polymer mixture is stirred at 300 rpm and heated at 195° C. for approximately 2 hours. Then 0.13% by mass of dimercaptosuccinic acid is added. The mixture is stirred at 300 rpm and heated at 195° C. for 2 hours. The quantities used are as follows: 1082.4 grams of bitumen, 57.05 grams of styrene/butadiene block copolymer and 1.47 grams of dimercaptosuccinic acid.

Bituminous Composition T₄ (Control)

A control bituminous composition T₄ is prepared in which the polymer is cross-linked with pentaerythrityl β-mercaptoproprionate of formula C[CH₂OOCCH₂CH₂SH]₄. The control bituminous composition T₄ is prepared as follows:
The following are introduced into a 2-litre hermetically sealed reactor under stirring (300 rpm) and at 195° C.:

94.87% by mass of a direct distillation bitumen with a penetrability of 50¹/₁₀ mm according to standard NF EN 1426 and 5% by mass of a styrene/butadiene block copolymer, with 25% by weight styrene and 75% by weight butadiene having a molecular mass by weight, Mw of 128,000 Dalton.

The bitumen/polymer mixture is stirred at 300 rpm and heated at 195° C. for approximately 2 hours. Then 0.13% by mass of pentaerythrityl β-mercaptoproprionate is added. The mixture is stirred at 300 rpm and heated at 195° C. for 2 hours. The quantities used are as follows: 1101.96 grams of bitumen, 58.08 grams of styrene/butadiene block copolymer and 1.51 grams of pentaerythrityl β-mercapto-proprionate.

Bituminous Compositions C₁ to C₈ According to the Invention

Several bituminous compositions C₁ to C₈ according to the invention are prepared using different cross-linking agents (with different R groups), at different concentrations. The bituminous compositions C₁ to C₈ according to the invention are prepared as follows:
The following are introduced into a 2-litre hermetically sealed reactor under stirring (300 rpm) and at 195° C.:

direct distillation bitumen with a penetrability of 50¹/₁₀ mm according to standard NF EN 1426 and styrene/butadiene block copolymer, with 25% by weight styrene and 75% by weight butadiene having a molecular mass by weight, Mw of 128,000 Dalton. The mixture is stirred at 300 rpm and heated at 195° C. for 2 hours. The cross-linking agent HS—R—SH is then added. The mixture is stirred at 300 rpm and heated at 195° C. for 2 hours.

In Table I below, the chemical natures of the different HS—R—SH cross-linking agents used are indicated:

TABLE I

| Bituminous Compositions | Cross-linking agent | R |
|---|---|---|
| C₁ to C₄ | 1,8-dimercapto-3,6-dioxaoctane | —(CH₂)₂—O—(CH₂)₂—O— |
| C₅ | 1,8 octanedithiol | —(CH₂)₈— |
| C₆ | Biphenyl-4,4'-dithiol | —C₆H₄—C₆H₄— |
| C₇ | 2 mercaptoethylether | —(CH₂)₂—O—(CH₂)₂— |
| C₈ | 1,4 butanedithiol | —(CH₂)₄— |

The cross-linking agent is introduced at different concentrations (from 0.05% to 0.3% by mass). The styrene/butadiene block copolymer is always introduced at a rate of 5% by mass, the bitumen being introduced in order to arrive at a total of 100% by mass. The quantities in percentages (for the cross-linking agent) and in grams (for the three constituents) used are indicated in Table II below:

TABLE II

| | Bituminous Compositions | | | | | | | |
|---|---|---|---|---|---|---|---|---|
| | C₁ | C₂ | C₃ | C₄ | C₅ | C₆ | C₇ | C₈ |
| Cross-linking agent | 0.13–1.27 | 0.05–0.84 | 0.2–3.07 | 0.3–5.04 | 0.13–0.68 | 0.13–0.63 | 0.15–0.7 | 0.15–0.7 |
| Bitumen (grams) | 924.5 | 1590.3 | 1455.8 | 1597.2 | 474 | 460 | 526 | 482 |
| Polymer (grams) | 48.72 | 83.7 | 76.8 | 84.33 | 25 | 24.3 | 27.6 | 25.5 |

Table III below shows the physical characteristics of the cross-linked $C_1$ to $C_8$ bitumen/polymer compositions according to the invention and Table IV below shows the physical characteristics of the control bitumen/polymer compositions $T_1$ to $T_4$.

the bitumen commences. For the cross-linking with sulphur it is accompanied by releases of hydrogen sulphide. In order to evaluate the quantity of hydrogen sulphide released during the cross-linking with the HS—R—SH agents according to the invention, the releases of hydrogen sulphide are measured

TABLE III

|  | $C_1$ | $C_2$ | $C_3$ | $C_4$ | $C_5$ | $C_6$ | $C_7$ | $C_8$ |
|---|---|---|---|---|---|---|---|---|
| Penetrability (0.1 mm)[1] | 37 | 41 | 39 | 41 | 36 | 31 | 39 | 38 |
| RBT (° C.)[2] | 62.4 | 61.2 | 63.2 | 62.6 | 64.8 | 66.6 | 62.6 | 63.6 |
| Elastic recovery[3] | 76 | 73 | 82 | 78 | 83 | 80 | 82 | 85 |
| Traction[4] | | | | | | | | |
| Threshold stress (MPa) | 1.58 | 1.73 | 1.8 | 1.67 | 1.63 | 1.66 | 1.50 | 1.56 |
| Threshold elongation (%) | 11.8 | 11.9 | 10.7 | 12.9 | 14.1 | 14.2 | 17.6 | 13.1 |
| Conventional energy at 400% elongation (J/cm$^2$)[3] | 12.3 | 13.1 | 13.4 | 13.5 | 14.4 | 17.4 | 12.8 | 13.6 |
| Max stress (MPa) | 1.58 | 1.81 | 1.8 | 1.67 | 1.64 | 1.66 | 1.51 | 1.58 |
| Max elongation stress (MPa) | 0.3 | 0.28 | 0.4 | 0.42 | 0.61 | 1.01 | 0.38 | 0.51 |
| Max elongation (%) | 671 | 423 | 700 | 700 | 700 | 638 | 700 | 700 |
| Total energy (J) | 1.93 | 1.57 | 2.64 | 2.33 | 2.75 | 3.30 | 2.21 | 2.37 |
| Gelling tendency after 14 days[5] | S0 | S0 | S0 | S0 | — | — | — | — |

[1] According to standard NF EN 1426.
[2] Ring and ball temperature, according to standard NF EN1427.
[3] Elastic recovery at 25° C. according to standard NF EN 13398.
[4] Traction test at 5° C., according to standard NF EN 13587, with a stretching rate of 500 mm/min.
[5] The gelling test consists of leaving a 1 kg container of binder at 180° C. for 14 days. Each time a measurement is made, a wooden stick is dipped into the container and the way in which the binder flows is examined. A scale of 0 to 4 makes it possible to describe the state of the binder.
S0: fluid binder, flows dropwise
S1: liquid binder, flows in a thin continuous thread
S2: viscous binder, flows in a broad continuous thread
S3: very viscous binder, flows in a sheet
S4: solid binder

TABLE IV

|  | $T_1$ | $T_2$ | $T_3$ | $T_4$ |
|---|---|---|---|---|
| Penetrability (0.1 mm)[1] | 46 | 45 | 45 | 45 |
| RBT (° C.)[2] | 60.2 | 62 | 60.2 | 58 |
| Elastic recovery[3] | 66 | 91 | 66 | 57 |
| Traction[4] | | | | |
| Threshold stress (MPa) | 1.75 | 1.32 | — | — |
| Threshold elongation (%) | 9.98 | 11.4 | — | — |
| Conventional energy at 400% elongation (J/cm$^2$) | 0.5 | 13.4 | — | — |
| Max stress (MPa) | 1.75 | 1.32 | — | — |
| Max elongation stress (MPa | 0.18 | 0.93 | — | — |
| Max elongation (%) | 180 | >700 | — | — |
| Total energy (J) | 0.86 | 3.04 | — | — |
| Gelling tendency after 14 days[5] | S0 | — | — | — |

[1] to [5] See Table III

In the light of the results compiled in Tables III and IV, it is possible to make the following comments:

All of the cross-linking agents described according to the invention make it possible to cross-link the bitumen/polymer compositions. In fact the Ring and Ball Temperature, penetrability, elastic recovery and traction values of the $C_1$ to $C_8$ compositions are similar to those of the control $T_2$. The cross-linking of the compositions $C_1$ to $C_8$ leads to an increase in consistency (increase in the Ring and Ball softening point temperature and reduction in the penetrability).

The cross-linking of the compositions $C_1$ to $C_8$ leads to an improvement in the elasticity characteristics (increase in traction elongation and maximum elongation stress, increase in elastic recovery). The cross-linking of the compositions $T_3$ and $T_4$ is not optimal as evidenced by the elastic recovery values which are similar to that of the composition $T_1$. The compositions $C_1$ to $C_8$ are stable and do not gel.

When the cross-linking agent is introduced into the bitumen/polymer mixture, the cross-linking of the copolymer in in gas phase using a probe placed in the reaction medium, over 2 hours.

At given times (5 min, 10 min, 20 min, 60 min, 120 min), the reductions in emissions of $H_2S$ obtained during the cross-linking of two bituminous compositions according to the invention ($C_1$ and $C_5$) are calculated as a percentage with respect to the control $T_2$, and the reductions in emissions of $H_2S$ obtained during the cross-linking of the two control bituminous compositions $T_3$ and $T_4$ are calculated as a percentage with respect to the control $T_2$ (Table V).

TABLE V

|  | Time (min) | | | | |
|---|---|---|---|---|---|
|  | 5 | 10 | 20 | 60 | 120 |
| $(T_2 - C_1)/T_2$ | 95% | 97% | 94% | 87% | 69% |
| $(T_2 - C_5)/T_2$ | 95% | 97% | 96% | 96% | 85% |
| $(T_2 - T_3)/T_2$ | 28% | −176% | −153% | −275% | −592% |
| $(T_2 - T_4)/T_2$ | 95% | 97% | 92% | 68% | 23% |

A significant reduction in the releases of $H_2S$ is noted for the compositions $C_1$ and $C_5$. Thus, for example for $C_1$ and $C_5$ at 10 minutes, the reduction in emissions of $H_2S$ is 97% with respect to the control $T_2$. The compositions $C_6$, $C_7$ and $C_5$ tested under the same conditions similarly show a very clear reduction in the releases of $H_2S$ with respect to the composition $T_2$.

The releases of $H_2S$ are by contrast much greater in the process for preparing the composition $T_3$ (there is no reduction in the quantities of hydrogen sulphide, but an increase with respect to $T_2$). The releases of $H_2S$ in the process for preparing the composition $T_4$ are smaller than in that of $T_2$ from 5 minutes to 20 minutes as for the process according to the invention, but from 60 minutes to 120 minutes, the process according to the invention makes it possible to more clearly reduce the releases of $H_2S$. Moreover, it seems that, according to the elastic recovery value of the composition $C_4$, the latter are not as well cross-linked as the compositions $C_1$ to $C_8$ (value of 57% compared with values of 73% to 85%).

The cross-linking, agents of the process implemented according to the invention therefore make it possible to obtain cross-linked bitumen/polymer compositions having good properties in particular in terms of elasticity without having the disadvantage of the standard cross-linking agent (sulphur) in terms of the releases of hydrogen sulphide. In particular, the cross-linking agents of the process implemented according to the invention make it possible to substantially reduce the releases of hydrogen sulphide during the process for cross-linking of the bitumen/polymer compositions whilst retaining good elastic properties.

The invention claimed is:

1. A process for preparing cross-linked bitumen/copolymer compositions, the process comprising, reducing emissions of hydrogen sulphide during preparation of cross-linked bitumen/copolymer compositions by bringing into contact at least one bitumen or mixture of bitumens with at least one copolymer, wherein said copolymer is based on conjugated diene units and aromatic monovinyl hydrocarbon units, and at least one cross-linking agent, while operating at temperatures comprises between 100° C. and 230° C. and under stirring, for a duration of at least ten minutes, said cross-linking agent being represented by the general formula HS—R—SH where R is selected from the group consisting of: a linear and saturated, exclusively hydrocarbon group with 8 to 40 carbon atoms and, a linear and saturated hydrocarbon group with 2 to 40 carbon atoms comprising at least one heteroatom and not comprising a carbonyl C—O function and/or carboxylate O—C—O function.

2. The process according to claim 1, in which the heteroatoms are oxygen atoms.

3. The process according to claim 2, in which the number of oxygen atoms varies from 1 to 5.

4. The process according to claim 1, in which the R group is selected from the group consisting of a saturated and linear exclusively hydrocarbon group with 8 to 20 carbon atoms.

5. The process according to claim 1, in which the reduced emissions of hydrogen sulphide is performed by bringing into contact at least one bitumen or mixture of bitumens with the copolymer and the cross-linking agent, while operating at temperatures comprised between 100° C. and 230° C. and under stirring, for a duration of at least ten minutes.

6. The process according to claim 1, in which the R group is selected from the group consisting of a linear and saturated hydrocarbon group with 2 to 20 carbon atoms comprising at least one heteroatom.

7. The process according to claim 6, in which the R group has the general formula: $(CH_2)_m$—O—$(CH_2)_n$— with m and n being integers varying from 1 to 10.

8. The process according to claim 6, in which the R group has the general formula: $(CH_2)_p$—O—$(CH_2)_q$—O—$(CH_2)_r$— with p, q and r being integers varying from 1 to 10.

9. The process according to claim 1, in which the quantity of cross-linking agent of general formula HS—R—SH is comprised between 0.05 and 5% by mass.

10. The process according to claim 1, in which the conjugated diene unit is selected from the group consisting of those comprising 4 to 8 carbon atoms per monomer.

11. The process according to claim 1 or 10, in which the aromatic monovinyl hydrocarbon unit is chosen from is selected from the group consisting of styrene, o-methyl styrene, p-methyl styrene, p-tert-butylstyrene, 2,3 dimethyl-styrene, α-methyl styrene, vinyl naphthalene, vinyl toluene, vinyl xylene, and analogues or mixtures thereof, in particular styrene.

12. The process according to claim 1, in which the quantity of copolymer is comprised between 0.5 and 20% by mass.

13. The process according to claim 1, in which the bitumen is selected from the group consisting of the atmospheric distillation residues, the vacuum distillation residues, visbroken residues, blown residues, deasphalted residues, mixtures thereof and combinations thereof.

14. The process according to claim 1, in which the bitumen also comprises at least one flux.

15. A bitumen/copolymer composition, the composition comprising at least one bitumen, at least one copolymer, wherein said copolymer is based on conjugated diene units and aromatic monovinyl hydrocarbon units, and at least one cross-linking agent of general formula HS—R—SH where R is selected from the group consisting of: a linear and saturated, exclusively hydrocarbon group with 8 to 40 carbon atoms and, a linear and a saturated hydrocarbon group with 2 to 40 carbon atoms comprising at least one heteroatom and not comprising a carbonyl C—O function and/or carboxylate O—C—O function.

16. The bitumen/copolymer composition according to claim 15, in which the number of oxygen atoms varies from 1 to 5.

17. The bitumen/copolymer composition according to claim 15, in which the R group is selected from the group consisting of:
  linear and, saturated, exclusively hydrocarbon group with 8 to 20 carbon atoms;
  a group of the general formula: $(CH_2)_m$—O—$(CH_2)_n$— with m and n being integers varying from 1 to 10;
  a group of the general formula: $(CH_2)_p$—O—$(CH_2)_q$—O—$(CH_2)_r$— with p, q and r being integers varying from 1 to 10.

18. The bitumen/copolymer composition according to claim 15, in which the quantity of cross-linking agent of general formula HS—R—SH is comprised between 0.05 and 5% by mass.

19. The bitumen/copolymer composition according to claim 15 in which the conjugated diene unit from is selected from the group consisting of those comprising 4 to 8 carbon atoms per monomer.

20. The bitumen/copolymer composition according to claim 15, in which the aromatic monovinyl hydrocarbon unit is selected from the group consisting of styrene, o-methyl styrene, p-methyl styrene, p-tert-butylstyrene, 2,3 dimethylstyrene, α-methyl styrene, vinyl naphthalene, vinyl toluene, vinyl xylene, and analogues or mixtures thereof, in particular styrene.

21. The bitumen/copolymer composition according to claim 15, in which the quantity of polymer is comprised between 0.5 and 20% by mass.

22. The bitumen/copolymer composition according to claim 15, in which the bitumen is selected from the group consisting of the atmospheric distillation residues, the vacuum distillation residues, visbroken residues, blown residues, deasphalted residues, mixtures thereof and combinations thereof.

23. The bitumen/copolymer composition according to claim 15, in which the bitumen also comprises at least one flux.

24. A bituminous binder obtained from a bitumen/copolymer composition according to claim 15.

25. The bituminous binder according to claim 15, wherein said binder is in an anhydrous form or in the form of an emulsion.

26. A mixture for producing a surface dressing, a hot mix, a cold mix, a cold-cast mix or an emulsion gravel, said mixture comprising aggregates and at least a bitumen/copolymer composition according to claim 15.

27. The bitumen/copolymer composition according to claim 15, comprising at least one bitumen or mixture of bitumens, the copolymer and the cross-linking agent.

28. The bitumen/copolymer composition according to claim 15, in which the heteroatoms are oxygen atoms.

29. A sealing membrane obtained from a bitumen/copolymer compositions according to claim 15.

30. A membrane obtained from a bitumen/copolymer compositions according to claim 15.

31. A priming coat obtained from a bitumen/copolymer compositions according to claim 15.

* * * * *